US012647800B2

(12) United States Patent
Liu et al.

(10) Patent No.: US 12,647,800 B2
(45) Date of Patent: Jun. 2, 2026

(54) MAC CE BASED COMMON BEAM INDICATION

(71) Applicant: Lenovo (Beijing) Limited, Beijing (CN)

(72) Inventors: Bingchao Liu, Beijing (CN); Chenxi Zhu, Fairfax, VA (US); Wei Ling, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 345 days.

(21) Appl. No.: 18/272,437

(22) PCT Filed: Jan. 14, 2021

(86) PCT No.: PCT/CN2021/071693
§ 371 (c)(1),
(2) Date: Jul. 14, 2023

(87) PCT Pub. No.: WO2022/151135
PCT Pub. Date: Jul. 21, 2022

(65) Prior Publication Data
US 2024/0098520 A1 Mar. 21, 2024

(51) Int. Cl.
H04W 16/28 (2009.01)
H04B 7/06 (2006.01)
(Continued)

(52) U.S. Cl.
CPC ........ H04W 16/28 (2013.01); H04B 7/06968 (2023.05); H04W 72/1273 (2013.01);
(Continued)

(58) Field of Classification Search
CPC ... H04B 7/06968; H04B 7/088; H04W 16/28; H04W 72/1273; H04W 72/232; H04W 76/20; H04W 80/02
See application file for complete search history.

(56) References Cited

U.S. PATENT DOCUMENTS 12,302,121 B2 * 5/2025 Matsumura ........... H04L 5/0053
12,302,320 B2 * 5/2025 Guo ..................... H04W 76/11
(Continued)

FOREIGN PATENT DOCUMENTS

CN 111327411 A 6/2020
CN 111328442 A 6/2020
(Continued)

OTHER PUBLICATIONS

Samsung, Moderator summary#2 for multi-beam enhancement, Oct. 26, 2020, 3GPP TSG RAN WG1 #103-e, Agenda Item: 8.1.1, Tdoc: R1-2009499 (Year: 2020).*
(Continued)

*Primary Examiner* — Eric Nowlin
(74) *Attorney, Agent, or Firm* — FIG. 1 Patents

(57) ABSTRACT

Methods and apparatuses for MAC CE based common beam indication are disclosed. In one embodiment, a method comprises receiving a higher layer parameter to enable MAC CE based common beam indication; receiving a common beam indication MAC CE; and determining a common beam according to the common beam indication MAC CE.

20 Claims, 4 Drawing Sheets

(51) Int. Cl.
H04W 72/1273 (2023.01)
H04W 72/232 (2023.01)
H04W 76/20 (2018.01)
H04W 80/02 (2009.01)

(52) U.S. Cl.
CPC ......... H04W 72/232 (2023.01); H04W 76/20
(2018.02); H04W 80/02 (2013.01)

(56) References Cited

U.S. PATENT DOCUMENTS

| | | | |
|---|---|---|---|
| 2019/0394793 A1 | 12/2019 | Venugopal et al. | |
| 2021/0153217 A1* | 5/2021 | Zhou | H04W 24/08 |
| 2022/0216929 A1* | 7/2022 | Matsumura | H04B 17/347 |
| 2022/0303788 A1* | 9/2022 | Zhang | H04B 7/0404 |
| 2022/0312456 A1* | 9/2022 | Guo | H04L 5/0053 |
| 2023/0132744 A1* | 5/2023 | Guo | H04L 5/0023 |
| | | | 370/329 |
| 2023/0171771 A1* | 6/2023 | Guo | H04L 5/0094 |
| | | | 370/329 |
| 2023/0300604 A1* | 9/2023 | Zhou | H04W 8/24 |
| | | | 370/328 |
| 2023/0309178 A1* | 9/2023 | Matsumura | H04L 5/0087 |
| 2023/0319591 A1* | 10/2023 | Zhou | H04L 5/0023 |
| | | | 370/329 |
| 2023/0354350 A1* | 11/2023 | Matsumura | H04W 16/28 |
| 2023/0379902 A1* | 11/2023 | Matsumura | H04B 7/0695 |
| 2023/0396301 A1* | 12/2023 | Yuan | H04B 7/0417 |
| 2023/0403108 A1* | 12/2023 | Grossmann | H04L 5/0091 |
| 2024/0015737 A1* | 1/2024 | Raghavan | H04W 16/28 |
| 2024/0063979 A1* | 2/2024 | Li | H04B 7/0639 |
| 2024/0073880 A1* | 2/2024 | Zhou | H04L 5/0048 |
| 2024/0098520 A1* | 3/2024 | Liu | H04B 7/06968 |
| 2024/0114579 A1* | 4/2024 | Yao | H04W 76/19 |
| 2024/0297755 A1* | 9/2024 | Yao | H04W 72/232 |
| 2024/0364488 A1* | 10/2024 | Sun | H04L 5/0094 |
| 2025/0080299 A1* | 3/2025 | Bai | H04L 5/0023 |
| 2025/0261194 A1* | 8/2025 | Guo | H04W 72/1273 |

FOREIGN PATENT DOCUMENTS

| | | | | | |
|---|---|---|---|---|---|
| CN | 111954249 A | * | 11/2020 | | H04W 24/08 |
| CN | 112166563 A | | 1/2021 | | |
| CN | 114128168 A | * | 3/2022 | | H04B 17/347 |
| CN | 114762422 A | * | 7/2022 | | H04W 72/23 |
| CN | 115997351 A | * | 4/2023 | | H04B 7/06966 |
| CN | 116097847 A | * | 5/2023 | | H04W 16/28 |
| CN | 116134759 A | * | 5/2023 | | H04B 7/06966 |
| CN | 116368836 A | * | 6/2023 | | H04W 72/1263 |
| CN | 116601901 A | * | 8/2023 | | H04B 7/06952 |
| CN | 114128168 B | * | 1/2024 | | H04B 17/347 |
| CN | 116601901 B | * | 9/2024 | | H04B 7/06952 |
| CN | 118945822 A | * | 11/2024 | | H04B 7/06952 |
| CN | 120153685 A | * | 6/2025 | | H04W 16/28 |
| EP | 3972320 A1 | * | 3/2022 | | H04B 17/347 |
| EP | 3989458 A1 | * | 4/2022 | | H04B 7/06968 |
| EP | 4154643 B1 | * | 4/2025 | | H04W 16/28 |
| JP | 7562694 B2 | * | 10/2024 | | H04W 72/231 |
| JP | 7664830 B2 | * | 4/2025 | | H04B 17/347 |
| KR | 20220006544 A | * | 1/2022 | | H04B 17/347 |
| KR | 20230098602 A | * | 7/2023 | | H04B 7/06968 |
| KR | 20230117349 A | * | 8/2023 | | H04B 7/06952 |
| WO | WO-2020230839 A1 | * | 11/2020 | | H04B 17/347 |
| WO | WO-2021121337 A1 | * | 6/2021 | | H04W 72/23 |
| WO | WO-2022052650 A1 | * | 3/2022 | | H04L 1/0031 |
| WO | WO-2022079902 A1 | * | 4/2022 | | H04W 16/28 |
| WO | WO-2022084484 A1 | * | 4/2022 | | H04B 7/06968 |
| WO | WO-2024192646 A1 | * | 9/2024 | | H04W 16/28 |

OTHER PUBLICATIONS

Samsung, Moderator summary#3 for multi-beam enhancement, Oct. 26, 2020, 3GPP TSG RAN WG1 #103-e, Agenda Item: 8.1.1, Tdoc: R1-2009574 (Year: 2020).*

Samsung, Moderator summary#4 for multi-beam enhancement, Oct. 26, 2020, 3GPP TSG RAN WG1 #103-e, Agenda Item: 8.1.1, Tdoc: R1-2009715 (Year: 2020).*

Samsung, Moderator summary#5 for multi-beam enhancement, Oct. 26, 2020, 3GPP TSG RAN WG1 #103-e, Agenda Item: 8.1.1, Tdoc: R1-2009749 (Year: 2020).*

PCT/CN2021/071693 , "International Preliminary Report on Patentability", PCT Application No. PCT/CN2021/071693, Jul. 27, 2023, 5 pages.

PCT/CN2021/071693 , "International Search Report and Written Opinion", PCT Application No. PCT/CN2021/071693, Oct. 19, 2021, 7 pages.

VIVO , "Discussion on multi-beam enhancement", 3GPP TSG RAN WG1 #102-e, R1-2005363, e-Meeting [retrieved Jun. 12, 2023]. Retrieved from the Internet <https://www.3gpp.org/ftp/TSG_RAN/WG1_RL1/TSGR1_102-e/Docs/>., Aug. 2020, 21 Pages.

VIVO , "Further discussion on multi beam enhancement", 3GPP TSG RAN WG1 #103-e, R1-2007644, e-Meeting [retrieved Jun. 12, 2023]. Retrieved from the Internet <https://www.3gpp.org/ftp/tsg_ran/WG1_RL1/TSGR1_103-e/Docs>., Oct. 2020, 26 Pages.

* cited by examiner

| R | | Serving cell ID | | BWP ID | Oct 1 |
|---|---|---|---|---|---|
| R | | PUCCH Resource ID | | | Oct 2 |
| R | R | Spatial Relation Info ID | | | Oct 3 |

| R | Serving cell ID | | BWP ID | Oct 1 |
|---|---|---|---|---|
| R | PUCCH Resource ID1 | | | Oct 2 |
| R | R | Spatial Relation Info ID1 | | Oct 3 |
| R | PUCCH Resource ID2 | | | Oct 4 |
| R | R | Spatial Relation Info ID2 | | Oct 5 |

600

Start

602 — receiving a higher layer parameter to enable MAC CE based common beam indication 604 — receiving a common beam indication MAC CE 606 — determining a common beam according to the common beam indication MAC CE

End

700

702 — transmitting a higher layer parameter to enable MAC CE based common beam indication 704 — transmitting a common beam indication MAC CE 706 — determining a common beam according to the common beam indication MAC CE

MAC CE BASED COMMON BEAM INDICATION

FIELD

The subject matter disclosed herein generally relates to wireless communications, and more particularly relates to methods and apparatuses for MAC CE based common beam indication.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), quasi co-location (QCL), reference signal (RS), Downlink Control Information (DCI), Sounding Reference Signal (SRS), SRS resource indicator (SRI), multiple DCI (multi-DCI), Physical Uplink Shared Channel (PUSCH), configured grant PUSCH (CG-PUSCH), Physical Uplink Control Channel (PUCCH), control resource set (CORESET), band width part (BWP), Medium Access Control (MAC), MAC control element (MAC CE), Physical Downlink Shared Channel (PDSCH), Physical Downlink Control Channel (PDCCH), Transmission Configuration Indication (TCI), Demodulation RS (DM-RS), channel state information reference signal (CSI-RS), Receiver (RX), Synchronization Signal Block (SSB), subcarrier space (SCS), transmission reception point (TRP), multiple TRP (multi-TRP or M-TRP), acknowledgment (ACK), pathloss Reference RS (PL-RS), frequency range 2 (FR2), (HARQ-ACK).

In NR Release 15 and Release 16, M (up to 128, which depends on UE capability) TCI states can be configured for a UE in a carrier (i.e. in a cell, since a carrier is used by a cell) by RRC signaling. For example, the TCI state is configured by the RRC signaling illustrated in Table 1.

As illustrated in Table 1, each TCI state contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

The UE may receive an activation command (e.g. TCI State Indication for UE-specific PDCCH MAC CE) that indicates one TCI state for one CORESET of a serving cell. The RX beam (i.e. DL beam or DL RX beam) for receiving DL (e.g. PDCCH) transmission is determined by the QCL-TypeD RS configured in the TCI state, i.e., the UE uses the same spatial RX parameter for the reception of the DL transmission and the QCL-TypeD RS configured in the indicated TCI state.

FIG. 1 illustrates a TCI State Indication for UE-specific PDCCH MAC CE for indicating TCI state. The TCI State Indication for UE-specific PDCCH MAC CE is identified by a MAC subheader with LCID as specified in 3GPP TS38.331 V16.4.0. It has a fixed size of 16 bits with following fields:

Serving Cell ID: This field indicates the identity of the Serving Cell for which the MAC CE applies. The length of the field is 5 bits.

CORESET ID: This field indicates a Control Resource Set (CORESET) identified with ControlResourceSetId, for which the TCI State is being indicated. The length of the field is 4 bits.

TCI State ID: This field indicates the TCI state applicable to the Control Resource Set (CORESET) identified by CORESET ID field. The length of the field is 7 bits.

TABLE 1

| RRC configuration for TCI state defined in 3GPP TS38.331 V16.4.0 in NR Release 15 and Release 16 |
| --- |

TCI state
The IE TCI state associates one or two DL reference signals with a corresponding quasi-colocation (QCL) type.

| | TCI state information element |
| --- | --- |
| TCI state ::= | SEQUENCE { |
| TCI stateId | TCI stateId, |
| qcl-Type1 | QCL-Info, |
| qcl-Type2 | QCL-Info |
| ... | |
| } | |
| QCL-Info ::= | SEQUENCE { |
| cell | ServCellIndex |
| bwp-Id | BWP-Id |
| referenceSignal | CHOICE { |
| csi-rs | NZP-CSI-RS-ResourceId, |
| ssb | SSB-Index |
| }, | |
| qcl-Type | ENUMERATED {typeA, typeB, typeC, typeD}, |
| ... | |
| } | |

It can be seen that the RX beam (DL beam) for receiving PDCCH transmission from different CORESETs can be semi-statically indicated by the TCI state indicated by the TCI State ID field contained in the TCI State Indication for UE-specific PDCCH MAC CE, which provides flexibility for PDCCH transmission and CORESET configuration. However, such dynamic beam indication causes higher signaling overhead and larger latency with unnecessary beam updating.

In view of the above, it is desirable that a common RX beam (common DL beam) is used to receiving transmissions in all DL channels, at least for the same carrier (i.e. same cell) or a set of carriers in a band, to reduce the signaling overhead and latency.

A TX beam (i.e. UL beam or UL TX beam) for UL transmission refers to the spatial relation for UL transmission.

When the UE supports joint DL/UL beam indication capability, a DL TCI state can also be used for the UL TX beam indication. In particular, the TX beam for UL transmission can be determined by the QCL-TypeD RS configured in the DL TCI state. For example, if the QCL-TypeD RS configured in the DL TCI state is a SSB or a CSI-RS resource, the UE shall transmit the target UL signal using the same spatial domain transmission filter used for the reception of the SSB or CSI-RS resource. The DL TCI state can be indicated by the same TCI State Indication for UE-specific PDCCH MAC CE illustrated in FIG. 1.

When the UE supports separate DL/UL beam indication capability, the TX beam for UL transmission can be explicitly configured in an enhanced PUCCH spatial relation activation/deactivation MAC CE. The spatial relation contained in the spatial relation info configured for a PUCCH resource is used as the TX beam for transmitting the PUCCH resource.

FIG. 2 illustrates an enhanced PUCCH spatial relation activation/deactivation MAC CE. The enhanced PUCCH spatial relation activation/deactivation MAC CE is identified by a MAC subheader with eLCID as specified in 3GPP TS38.331 V16.4.0. It has a variable size with following fields:

Serving Cell ID: This field indicates the identity of the Serving Cell for which the MAC CE applies. The length of the field is 5 bits.

BWP ID: This field indicates a UL BWP for which the MAC CE applies as the codepoint of the DCI bandwidth part indicator field. The length of the BWP ID field is 2 bits.

PUCCH Resource ID: Each PUCCH Resource ID field contains an identifier of the PUCCH resource ID. The length of each PUCCH Resource ID field is 7 bits.

Spatial Relation Info ID: Each Spatial Relation Info ID field contains an identifier of the PUCCH Spatial Relation Info ID identified by PUCCH-SpatialRelationInfold in PUCCH-Config in which the PUCCH Resource ID is configured. The length of each Spatial Relation Info ID field is 6 bits.

R: Reserved bit, set to 0.

Beam-specific power control is supported for UL transmission in NR Release 15. For example, each spatial relation info for PUCCH resource is associated with a set of power control parameters, where the power control parameters include at least pathlossReferenceRS (PL-RS) used for pathloss estimation and may further include P0 and closed loop index, where P0 configures the target receive power.

The dynamic beam indication causes higher signaling overhead and larger latency with unnecessary beam updating. It is desirable that a common TX beam (i.e. common UL beam) for all UL channels is used for transmission of all UL channels to reduce the signaling overhead and latency.

This invention discloses methods and apparatuses for determining common DL and/or UL beams for all DL and/or UL channels.

BRIEF SUMMARY

Methods and apparatuses for MAC CE based common beam indication are disclosed.

In one embodiment, a method comprises receiving a higher layer parameter to enable MAC CE based common beam indication; receiving a common beam indication MAC CE; and determining a common beam according to the common beam indication MAC CE.

In one embodiment, the common beam indication MAC CE contains a TCI field indicating a TCI state, and a common DL beam and a common UL beam are determined for a UE with joint DL/UL beam indication capability according to the indicated TCI state, or a common DL beam is determined for a UE with separate DL/UL beam indication capability according to the indicated TCI state. The indicated TCI state applies to reception of all PDCCH and PDSCH transmissions in all BWPs in a cell indicated by the common beam indication MAC CE. The QCL-TypeD RS contained in the indicated TCI state is determined as the spatial relation and the PL-RS for transmission of all PUCCH and PUSCH transmissions in all BWPs in a cell indicated by the common beam indication MAC CE for the UE with joint DL/UL beam indication capability. When a higher layer parameter CORESETPoolIndex is configured for each CORESET, the indicated TCI state applies to reception of all PDCCH transmissions from the CORESET(s) configured with the same CORESETPoolIndex as that configured for the CORESET indicated by the common beam indication MAC CE, and to reception of all PDSCH transmissions scheduled by DCI(s) transmitted from the CORESETs configured with the same CORESET-PoolIndex as that configured for the CORESET indicated by—the common beam indication MAC CE. The QCL-TypeD RS contained in the indicated TCI state is determined as the spatial relation and the PL-RS for transmission of all PUCCH and PUSCH transmissions associated with the same CORESETPoolIndex as that configured for the CORESET indicated by the common beam indication MAC CE.

In another embodiment, the common beam indication MAC CE indicates at least one spatial relation info, and a common UL beam is determined for the UE with separate DL/UL beam indication capability according to the indicated spatial relation info(s). The spatial relation contained in and the PL-RS associated with a first indicated spatial relation info are determined as the spatial relation and the PL-RS for transmission of all PUCCH and PUSCH transmissions in all BWPs in a cell indicated by the common beam indication MAC CE, if no CORESETPoolIndex is configured for any CORESET in the cell indicated by the common beam indication MAC CE. The spatial relation contained in and the PL-RS associated with a first indicated spatial relation info are determined as the spatial relation and the PL-RS for transmission of all PUCCH resources associated with CORESETPoolIndex=0 and all PUSCH transmissions scheduled by DCI(s) transmitted from CORESET(s) configured with CORESETPoolIndex=0 in all BWPs in a cell indicated by the common beam indication MAC CE, and the spatial relation contained in and the PL-RS associated with a second indicated spatial relation info are determined as the spatial relation and the PL-RS for transmission of all PUCCH resources associated with CORESETPoolIndex=1 and all PUSCH transmissions scheduled by DCI(s) transmitted from CORESET(s) with CORESETPoolIndex=1 in all BWPs in the cell indicated by the common beam indication MAC CE, if a CORESET-PoolIndex is configured for the CORESET(s) in the cell indicated by the common beam indication MAC CE. When a higher layer parameter CORESETPoolIndex is configured for each CORESET, the spatial relation contained in and the PL-RS associated with the indicated spatial relation info are determined as the spatial relation and the PL-RS for transmission of all PUCCH resources associated with the same CORESETPoolIndex and all PUSCH transmissions scheduled by DCI(s) transmitted from the CORESET(s) configured with the same CORESETPoolIndex as that associated with a PUCCH resource indicated in the common beam indication MAC CE in all BWPs in a cell indicated by the common beam indication MAC CE.

In some embodiment, the method further comprises receiving a configuration of one or more cell lists each of which is composed of one or multiple serving cells, wherein the common UL beam for UL transmission is enabled for all serving cells in a cell list containing the serving cell.

In some embodiment, the common beam indication MAC CE contains a TCI field indicating a TCI state, and the indicated TCI state applies to reception of all PDCCH and PDSCH transmissions and transmission of all PUCCH and PUSCH transmissions in all BWPs in all cells belonging to a cell list containing the cell indicated by the common beam indication MAC CE. In other embodiment, the common beam indication MAC CE indicates a spatial relation info, and the indicated spatial relation info applies to transmission of all PUCCH and PUSCH transmissions in all BWPs in all cells belonging to a cell list containing the cell indicated by the common beam indication MAC CE.

In another embodiment, a remote unit comprises a receiver that receives a higher layer parameter to enable MAC CE based common beam indication, and further receives a common beam indication MAC CE; and a processor that determines a common beam according to the common beam indication MAC CE.

In one embodiment, a method comprises transmitting a higher layer parameter to enable MAC CE based common beam indication; transmitting a common beam indication MAC CE; and determining a common beam according to the common beam indication MAC CE.

In yet another embodiment, a base unit comprises a transmitter that transmits a higher layer parameter to enable MAC CE based common beam indication, and transmits a common beam indication MAC CE; and a processor that determines a common beam according to the common beam indication MAC CE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
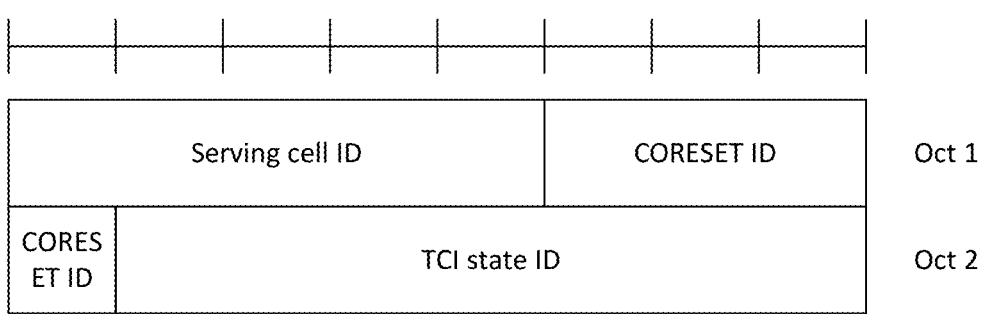
FIG. 1 illustrates a TCI State Indication for UE-specific PDCCH MAC CE that is used as a common beam indication MAC CE.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

Figure 3:
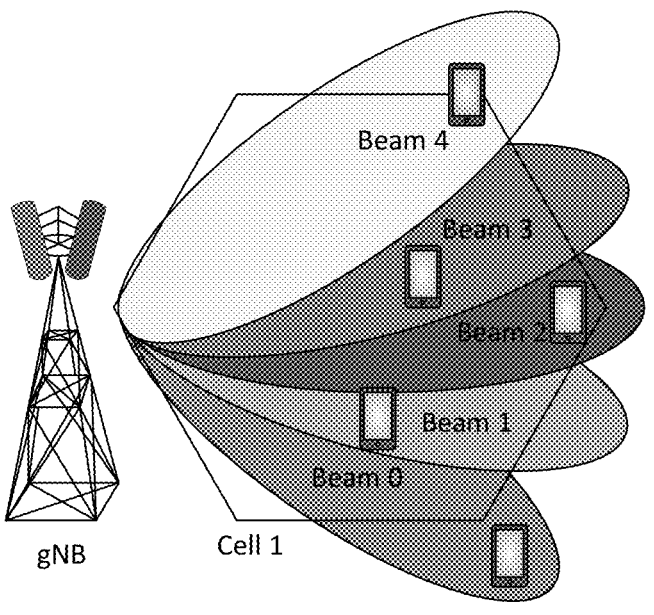
FIG. 3 illustrates multi-beam coverage for a cell.

FIG. 3 illustrates multi-beam coverage for a cell. As illustrated in FIG. 3, a serving cell, e.g. Cell #1, is covered by 5 different beams (i.e. Beam 0, Beam 1, Beam 2, Beam 3 and Beam 4) transmitted by the gNB. If a UE is located in the coverage area of a certain beam, it is reasonable for the UE to use the same beam (common DL beam) for reception of DL control and data channel. For example, if the UE is in the coverage of Beam 2 shown in FIG. 3, the UE can receive all PDCCH transmissions from all CORESETs other than CORESET #0 (CORESET #0 can be used for system information scheduling with dedicated beam), and all PDSCH transmissions in all BWPs in a carrier used by the cell by using a common DL beam (i.e. Beam 2). Note that each CORESET identifies a set of time-frequency resources used for PDCCH transmission, and that each BWP configures a partial band of a carrier with dedicated subcarrier space. When the UE moves from the coverage of one beam to the coverage of another beam, the common DL beam should also switch to the other beam. For example, when the UE moves from the coverage of Beam 2 to the coverage of Beam 3, the common DL beam for DL reception should switch to Beam 3 from Beam 2.

When the UE supports joint DL/UL beam indication capability (for the UE with joint DL/UL beam indication capability), it is reasonable that the above described common DL beam can be also used as common UL beam for all UL transmissions (i.e. for all UL channels), e.g., PUSCH transmissions and PUCCH transmissions.

When the UE supports separate DL/UL beam indication capability (i.e. for the UE with separate DL/UL beam indication capability), the common UL beam should be configured separately from the common DL beam.

In order to implement common DL beam and common UL beam, the following procedures are necessary: how to configure the UE to support common beam (i.e. common DL beam and common UL beam) in a carrier; how to indicate the common beam (or common DL beam and common UL beam) to the UE, e.g. by a MAC CE or a DCI; how the UE determines the common beam (or common DL beam and common UL beam).

According to a first embodiment, the network explicitly indicates that the UE (either the UE with joint DL/UL beam indication capability or the UE with separate DL/UL beam indication capability) supports common beam (or common DL beam and common UL beam). In particular, the UE should support common DL beam for all DL channels and support common UL beam for all UL channels. The indication can be made by a RRC parameter. For example, a higher layer parameter enableCommonBeam can be set as 'enabled' to indicate the UE that common DL beam for DL reception and common UL beam for UL transmission are configured. Alternatively, a higher layer parameter enableCommonBeamForDL can be set as 'enabled' to indicate the UE that common DL beam for DL reception is configured, and a higher layer parameter enableCommonBeamForUL can be set as 'enabled' to indicate the UE that common UL beam for UL transmission is configured. The common beam (or common DL beam and common UL beam) can be for example indicated by an activation command (e.g. MAC CE). Preferably, if the common beam can be indicated by different manners, a mode can be configured together with the higher layer parameter enableCommonBeam, enableCommonBeamForDL or enableCommonBeamForUL. The mode may be configured as for example "mode1" to indicate that the common beam (or common DL beam and common UL beam) is indicated by an activation command (e.g. MAC CE). Incidentally, the mode may be configured as for example "mode2" to indicate that the common beam is indicated by another manner, e.g. by DCI.

In particular, the UE receives from the network (e.g. gNB) the higher layer parameter enableCommonBeam or enableCommonBeamForDL and enableCommonBeamForUL set as 'enabled' to enable common beam e.g., common DL beam for DL reception and common UL beam for UL transmission, for a cell.

Figure 2:
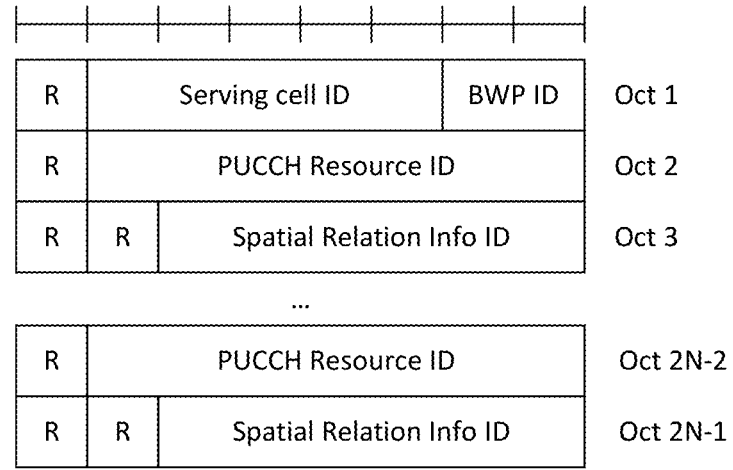
FIG. 2 illustrates an enhanced PUCCH spatial relation activation/deactivation MAC CE that is used as a common UL beam indication MAC CE.

According to a second embodiment, for the UE with joint DL/UL beam indication capability, the TCI State Indication for UE-specific PDCCH MAC CE illustrated in FIG. 2 can be reused as common beam activation command, e.g. common beam indication MAC CE to indicate the common beam (both common DL beam and common UL beam) for the UE for a serving cell.

In particular, when a UE receives a common beam indication MAC CE illustrated in FIG. 2, the indicated TCI state is used to determine both the common DL beam and the common UL beam for the serving cell indicated by the common beam indication MAC CE.

In particular, for the determination of the common DL beam, the indicated TCI state applies to reception of all PDCCH and PDSCH transmissions in the carrier used by the serving cell indicated in the serving cell ID field contained in the MAC CE (i.e. the UE shall receive all PDCCH and PDSCH transmissions using the same spatial domain filter as that used for the reception of the QCL-TypeD RS contained in the indicated TCI state). In short, the indicated TCI state determines the common DL beam.

For the determination of the common UL beam, the spatial relation for all PUCCH and PUSCH transmissions is determined by the QCL-TypeD RS contained in the indicated TCI state (i.e. the UE shall transmit all PUCCH and PUSCH transmissions using the same spatial domain transmission filter as that used for reception of the QCL-TypeD RS contained in the indicated TCI state). In addition, if a PL-RS is associated with the indicated TCI state, the associated PL-RS is applied to the power control procedure of all PUCCH and PUSCH transmissions. Otherwise, the UE determines a periodic RS that has an identical ID as the QCL-TypeD RS contained in the indicated TCI state as the PL-RS for the PUCCH and PUSCH transmissions. In short, the QCL-TypeD RS contained in the indicated TCI state is determined as the spatial relation and the PL-RS for transmission of all PUCCH and PUSCH transmissions.

Incidentally, the power control parameters for the power control procedure of PUCCH and PUSCH transmissions include, in addition to PL-RS, other power control parameters including P0, alpha (which configures the factor for pathloss compensation) and closed loop index. The other power control parameters can be obtained by the following manners.

For PUSCH transmission scheduled by a DCI, the other power control parameters can be obtained by SRI field contained in the DCI.

For CG-PUSCH resource, the other power control parameters can be configured by RRC signaling.

For PUCCH resource, the other power control parameters can be configured by RRC signaling.

According to a variety of the second embodiment, for the UE with joint DL/UL beam indication capability, when the common beam indication MAC CE illustrated in FIG. 1 is used to indicate the common beam for the UE for a serving cell, if a higher layer parameter CORESETPoolIndex is configured for each CORESET for TRP differentiation in multi-DCI based multi-TRP scenario, where a UE is served by multiple (e.g. two) TRPs in a same carrier and each TRP can transmit a DCI scheduling a PDSCH transmission transmitted from this TRP, the indicated TCI state is used to determine both the common DL beam and the common UL beam for the serving cell based on the CORESETPoolIndex value configured for the CORESET indicated by the CORE-SET ID field contained in the common beam indication MAC CE.

In particular, for the determination of the common DL beam, the indicated TCI state applies to all PDCCH transmissions transmitted from the CORESET(s) configured with the same CORESETPoolIndex value as that configured for the indicated CORESET, and applies to all PDSCH transmissions scheduled by DCI(s) transmitted from the CORE-SET(s) configured with the same CORESETPoolIndex value as that configured for the indicated CORESET.

For the determination of the common UL beam, the QCL-TypeD RS contained in the indicated TCI state determines the spatial relation and the PL-RS for all PUCCH resources associated with the same CORESETPoolIndex value as that configured for the indicated CORESET, for all PUSCH transmissions scheduled by DCI(s) transmitted from the CORESET(s) configured with the same CORE-SETPoolIndex value as that configured for the indicated CORESET, and for all CG-PUSCH (e.g. type 1 and type 2 configured grant PUSCH) transmissions associated with the same CORESETPoolIndex value as that configured for the indicated CORESET.

In the second embodiment and the variety of the second embodiment, when the common beam indication MAC CE is received by the UE, the common beam (common DL beam and common UL beam) determined according to the TCI state indicated by the TCI state ID field contained in the common beam indication MAC CE (especially, the QCL-TypeD RS contained in the indicated TCI state) applies in the same timing as that defined in NR Release 15 and Release 16, i.e. from the first slot that is after slot $$k + 3N_{slot}^{subframe,\mu},$$

where k is the slot where the UE would transmit a PUCCH with HARQ-ACK information for the PDSCH providing the activation command, and $\mu$ is the SCS configuration for the PUCCH subframe. For subcarrier spacing configuration $\mu$, slots are numbered $$n_s^\mu \in \left\{0, \dots, N_{slot}^{subframe,\mu} - 1\right\}$$

in increasing order within a subframe and $$n_{s,f}^\mu \in \left\{0, \dots, N_{slot}^{frame,\mu} - 1\right\}$$

in increasing order within a frame. There are $$N_{slot}^{subframe,\mu}$$

consecutive slot(s) in a subframe where $$N_{slot}^{subframe,\mu}$$

depends on the subcarrier spacing configuration $\mu$ and the cyclic prefix as given by Tables 2 and 3. There are $$N_{symb}^{slot}$$

consecutive OFDM symbols in a slot where $$N_{symb}^{slot}$$

depends on the cyclic prefix as given by Tables 2 and 3.

TABLE 2

Number of OFDM symbols per slot, slots per frame, and slots per subframe for normal

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

Number of OFDM symbols per slot, slots per frame, and slots per subframe for extended

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the second embodiment and the variety of the second embodiment, when the common beam indication MAC CE is received by the UE to indicate the common beam, the UE does not expect to receive TCI States Activation/Deactivation for UE-specific PDSCH MAC CE.

In addition, when the common beam indication MAC CE is received by the UE, the UE expects that the TCI field is absent (i.e. not included) in the DL DCI scheduling a PDSCH transmission. In particular, the UE expects that the higher layer parameter tci-PresentInDCI is set as disabled for each CORESET and that the higher layer parameter tci-PresentDCI-1_2 is not configured for each CORESET. The TCI field is optionally contained in DL DCI format 1_1 and 1_2. A higher layer parameter tci-PresentInDCI configures whether the TCI field is contained in DCI format 1_1 for a CORESET. When the higher layer parameter tci-PresentInDCI is set to 'disabled' for a CORESET, the TCI field is not contained in DCI format 1_1 transmitted from the CORESET. A higher layer parameter tci-PresentDCI-1-2-r16 configures whether the TCI field is contained in DCI format 1_2 for a CORESET. When the higher layer parameter tci-PresentDCI-1-2-r16 is not configured for a CORE-SET, the TCI field is not contained in DCI format 1_2 transmitted from the CORESET.

Moreover, the UE does not expect to receive a MAC CE to indicate a spatial relation for a PUCCH resource or a group of PUCCH resources.

An example of the variety of the second embodiment is as follows: A UE is configured with 12 CORESETs in a carrier used by a cell, a higher layer parameter CORESETPoolIndex=0 is configured for CORESET #1, CORESET #2, CORESET #3, CORESET #4, CORESET #5, and CORESET #6 while CORESETPoolIndex=1 is configured for CORESET #7, CORESET #8, CORESET #9, CORESET #10, CORESET #11, and CORESET #12. The UE has joint DL/UL beam indication capability and receives a higher layer parameter enableCommonBeam or enableCommon-BeamForDL and enableCommonBeamUL set as 'enabled' to enable common beam.

When the UE receives a common beam indication MAC CE to indicate TCI-state #9 for CORESET #2 (i.e. TCI-state #9 is indicated by TCI state ID field contained in the common beam indication MAC CE, and CORESET #2 is indicated by CORESET ID field contained in the common beam indication MAC CE), the UE shall apply TCI-state #9 to all PDCCH transmissions transmitted from CORESET #1, CORESET #2, CORESET #3, CORESET #4, CORESET #5, and CORESET #6, and apply TCI-state #9 to all PDSCH transmissions scheduled by DCIs transmitted from CORESET #1, CORESET #2, CORESET #3, CORESET #4, CORESET #5, and CORESET #6.

In addition, the UE shall determine the QCL-TypeD RS contained in TCI-state #9 as the spatial relation and the PL-RS for all PUCCH resources and all CG-PUSCH transmissions associated with CORESETPoolIndex=0, and all PUSCH transmissions scheduled by DCIs transmitted from CORESET #1, CORESET #2, CORESET #3, CORESET #4, CORESET #5, and CORESET #6.

One or more cell lists, each of which contains multiple cells, can be configured for a UE with joint DL/UL beam indication capability for simultaneous common beam indication for all cells in a cell list. Note that the UE has joint DL/UL beam indication capability for all cells contained in the cell list. For example, a UE with joint DL/UL beam indication capability is configured with 8 serving cells. Serving cells with indices 0, 1, 2 and 3 can be configured to belong to one cell list, e.g., simultaneousCommonBeam-UpdatedList1, and serving cells with indices 4, 5, 6 and 7 can be configured to belong to another cell list, e.g., simultaneousCommonBeam-UpdatedList2.

According to a further variety of the second embodiment, for the UE with joint DL/UL beam indication capability, when the common beam indication MAC CE illustrated in FIG. 1 is used to indicate the common beam for the UE for a serving cell, if the serving cell indicated by serving cell ID field contained in the common beam indication MAC CE is configured as part of a cell list, simultaneous common beam updating for all serving cells in the cell list is supported. In particular, the indicated TCI state ID by the common beam indication MAC CE applies to reception of all PDCCH and PDSCH transmissions and transmission of all PUCCH and PUSCH transmissions in all BWPs in all serving cells in the cell list containing the serving cell indicated by the serving cell ID field contained in the common beam indication MAC CE.

For example, according to the further variety of the second embodiment, when the common beam feature is enabled and a UE receives common beam indication MAC CE to indicate TCI-state #9 for CORESET #2 in a cell with serving cell ID 7, the UE shall apply TCI-state #9 to reception of all PDCCH and PDSCH transmissions in all active BWPs in cells with serving cell IDs 4, 5, 6 and 7, and shall determine the QCL-TypeD RS contained in TCI-state #9 as the spatial relation and the PL-RS for all PUSCH and PUCCH transmissions in all active BWPs in cells with serving cell IDs 4, 5, 6 and 7.

When the common beam indication MAC CE is received by the UE, the common beam (common DL beam and common UL beam) determined according to the TCI state indicated by the TCI state ID field contained in the common beam indication MAC CE (especially, the QCL-TypeD RS contained in the indicated TCI state) applies in the first slot that is after $$\text{slot } k + 3N_{slot}^{subframe,\mu},$$

where k is the slot where the UE would transmit a PUCCH with HARQ-ACK information for the PDSCH providing the activation command, and a is the smallest SCS configuration of the active DL BWPs of all serving cells in the cell list.

According to a third embodiment, for the UE with separate DL/UL beam indication capability, the TCI State Indication for UE-specific PDCCH MAC CE illustrated in FIG. 1 can be reused as common DL beam indication MAC CE to indicate the common DL beam for the UE for a serving cell. The detailed implementation is the same as that described in the second embodiment (as well as in the variety of the second embodiment and the further variety of the second embodiment) for the determination of common DL beam.

According to a fourth embodiment, for the UE with separate DL/UL beam indication capability, the enhanced PUCCH spatial relation activation/deactivation MAC CE illustrated in FIG. 2 can be reused as common UL beam indication MAC CE to indicate the common UL beam for the UE for a serving cell. In particular, the spatial relation(s) contained in the spatial relation info(s) indicated by spatial relation info ID(s) field can be used to determine the spatial relation(s) and the power control parameters of all PUCCH and PUSCH transmissions to the cell indicated by the serving cell ID field contained in the common UL beam indication MAC CE.

When no CORESETPoolIndex is configured for any CORESET in the carrier, only one spatial relation info is necessary to indicate the common UL beam. Therefore, the spatial relation info indicated by one spatial relation info ID field (e.g. a first spatial relation info ID field) contained in the common UL beam indication MAC CE (maybe referred to as "the first indicated spatial relation info") is used to determine the spatial relation and the power control parameters of all PUCCH and PUSCH transmissions to the cell indicated by the serving cell ID field contained in the common UL beam indication MAC CE. For simplicity, the common UL beam indication MAC CE may only contain one spatial relation info ID field (and one PUCCH resource ID field), as illustrated in FIG. 4.

Figure 4:
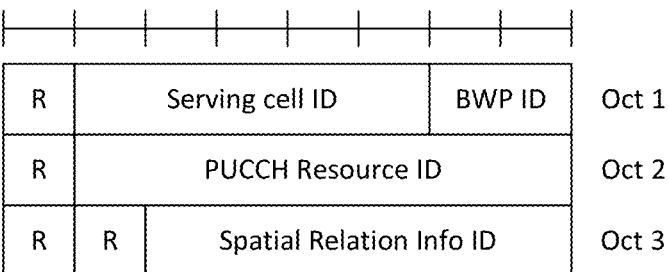
FIG. 4 illustrates an example of common UL beam indication MAC CE.

As illustrated in FIG. 4, the spatial relation contained in the spatial relation info indicated by the spatial relation info ID field contained in the common UL beam indication MAC CE applies to all PUCCH and PUSCH transmissions to the cell indicated by the serving cell ID field contained in the common UL beam indication MAC CE; and the power control parameters associated with the spatial relation info indicated by the spatial relation info ID field contained in the common UL beam indication MAC CE apply to power control procedures of all PUCCH and PUSCH transmissions to the cell indicated by the serving cell ID field contained in the common UL beam indication MAC CE. Alternatively, only the PL-RS associated with the spatial relation info indicated by the spatial relation info ID field contained in the common UL beam indication MAC CE is determined as the PL-RS used for PUSCH and PUCCH transmissions, the other power control parameters including P0, alpha and closed loop index can be obtained or configured by the following manners.

For PUSCH transmission scheduled by a DCI, the other power control parameters can be obtained by SRI field contained in the DCI.

For CG-PUSCH resource, the other power control parameters can be configured by RRC signaling.

For PUCCH resource, the other power control parameters can be configured by RRC signaling.

According to a variety of the fourth embodiment, when CORESETPoolIndex is configured for the CORESETs in the carrier, two spatial relation infos are necessary to indicate two common UL beams, each of which applies to all PUCCH and PUSCH transmissions associated with a different CORESETPoolIndex value (i.e. all PUCCH resources associated with a different CORESETPoolIndex value, all PUSCH transmissions scheduled by DCI(s) transmitted from CORESETs configured with a different CORESET-PoolIndex value, and all CG-PUSCH transmissions associated with a different CORESETPoolIndex value). Two alternative solutions for indicating two common UL beams are provided.

In a first solution, the PUCCH resource is associated with a CORESETPoolIndex value configured for the CORESETs in a cell. The common UL beam indication MAC CE illustrated in FIG. 4 is still used to indicate the common UL beam. In particular, the spatial relation info indicated by the spatial relation info ID field contained in the common UL beam indication MAC CE illustrated in FIG. 4 (referred to as "the indicated spatial relation info") only applies to all PUCCH and PUSCH transmissions that are associated with a CORESETPoolIndex value that is the same as that associated with the PUCCH resource indicated by the PUCCH resource ID field contained in the common UL beam indication MAC CE, and are to the cell indicated by the serving cell ID field contained in the common UL beam indication MAC CE.

In detail, the spatial relation contained in the indicated spatial relation info applies to all PUCCH and PUSCH transmissions associated with the same CORESETPoolIndex value as that associated with the PUCCH resource indicated by the PUCCH resource ID field contained in the common UL beam indication MAC CE. The power control parameters (or the PL-RS) associated with the indicated spatial relation info apply to all PUCCH and PUSCH transmissions associated with the same CORESETPoolIndex value as that associated with the PUCCH resource indicated by the PUCCH resource ID field contained in the common UL beam indication MAC CE. The expression "all PUCCH and PUSCH transmissions associated with the same CORESETPoolIndex value" means all PUCCH resources associated with the same CORESETPoolIndex value, all PUSCH transmissions scheduled by DCIs transmitted from the CORESET(s) configured with the same CORESETPoolIndex value, and all CG-PUSCH transmissions associated with the same CORESETPoolIndex value.

An example of the first solution of the variety of the fourth embodiment is as follows: A UE is configured with 12 CORESETs in a carrier used by a serving cell. A higher layer parameter CORESETPoolIndex=0 is configured for CORE- SET #1, CORESET #2, CORESET #3, CORESET #4, CORESET #5 and CORESET #6 while CORESETPoolIndex=1 is configured for CORESET #7, CORESET #8, CORESET #9, CORESET #10, CORESET #11 and CORE-SET #12. The UE has separate DL/UL beam indication capability and receives a configuration to enable common beam.

When the UE receives a common UL beam indication MAC CE to indicate spatial relation info #9 for PUCCH resource #2 (i.e. spatial relation info #9 is indicated by spatial relation info ID field contained in the common UL beam indication MAC CE, and PUCCH resource #2 is indicated by PUCCH resource ID field contained in the common UL beam indication MAC CE) and PUCCH resource #2 is associated with CORESETPoolIndex=1, the UE shall apply the spatial relation info #9 to all PUCCH resources and CG-PUSCH transmissions associated with CORESETPoolIndex=1, and to all PUSCH transmissions scheduled by DCIs transmitted from CORESET #7, CORE-SET #8, CORESET #9, CORESET #10, CORESET #11, and CORESET #12.

Figure 5:
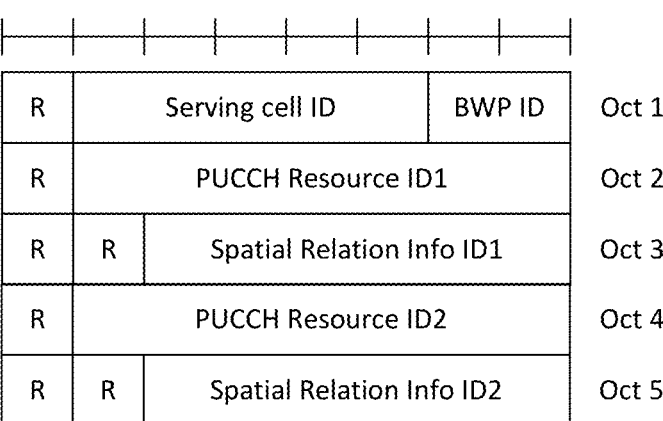
FIG. 5 illustrates an example of second common UL beam indication MAC CE.

In a second solution, two spatial relation info ID fields and two PUCCH resource ID fields are contained in the common UL beam indication MAC CE illustrated in FIG. 2. That is, a second common UL beam indication MAC CE illustrated in FIG. 5 is used to indicate two common UL beams. In particular, the spatial relation info1 indicated by the spatial relation info ID1 field contained in the second common UL beam indication MAC CE illustrated in FIG. 5 (referred to as "first indicated spatial relation info") only applies to all PUCCH and PUSCH transmissions that are associated with CORESETPoolIndex=0, and the spatial relation info2 indicated by the spatial relation info ID2 field contained in the second common UL beam indication MAC CE illustrated in FIG. 5 (referred to as "second indicated spatial relation info") only applies to all PUCCH and PUSCH transmissions that are associated with CORESETPoolIndex=1.

In detail, the spatial relation contained in the first indicated spatial relation info applies to all PUCCH and PUSCH transmissions associated with CORESETPoolIndex=0. The power control parameters (or the PL-RS) associated with the first indicated spatial relation info apply to all PUCCH and PUSCH transmissions associated with CORESETPoolIndex=0. The "all PUCCH and PUSCH transmission associated with CORESETPoolIndex=0" means all PUCCH resources associated with CORESETPoolIndex=0, all PUSCH transmissions scheduled by DCIs transmitted from the CORESET(s) configured with CORESETPoolIndex=0, and all CG-PUSCH transmissions associated with CORE-SETPoolIndex=0. The spatial relation contained in the second indicated spatial relation info applies to all PUCCH and PUSCH transmissions associated with CORESETPoolIndex=1. The power control parameters (or the PL-RS) associated with the second indicated spatial relation info apply to all PUCCH and PUSCH transmissions associated with CORESETPoolIndex=1. The "all PUCCH and PUSCH transmission associated with CORESETPoolIndex=1" means all PUCCH resources associated with CORESET-PoolIndex=1, all PUSCH transmissions scheduled by DCIs transmitted from the CORESET(s) configured with CORE-SETPoolIndex=1, and all CG-PUSCH transmissions associated with CORESETPoolIndex=1.

According to a further variety of the fourth embodiment, for the UE with separate DL/UL beam indication capability, when the common UL beam indication MAC CE illustrated in FIG. 4 is used to indicate the common UL beam for the UE for a serving cell, if the serving cell indicated by serving cell ID field contained in the common beam indication MAC CE is configured as part of a cell list (e.g. simultaneous-CommonBeam-UpdatedList1 or simultaneousCommon-Beam-UpdatedList2), simultaneous common UL beam updating for all serving cells in the cell list is supported. In particular, the indicated spatial relation info applies to all PUCCH and PUSCH transmissions in all BWPs in all serving cells belonging to the cell list containing the serving cell indicated by the serving cell ID contained in the common UL beam indication MAC CE.

For example, a UE with separate DL/UL beam indication capability is configured with 8 serving cells. Serving cells with indices 0, 1, 2 and 3 are configured to belong to one cell list, e.g., simultaneousCommonBeam-UpdatedList1, and serving cells with indices 4, 5, 6 and 7 are configured to belong to another cell list, e.g., simultaneousCommonBeam-UpdatedList2.

When the common beam feature is enabled and the UE receives common UL beam indication MAC CE to indicate spatial relation info #16 for PUCCH resource #28 in a serving cell with index 1 (i.e. serving cell with index 1 is indicated by the serving cell ID field; PUCCH resource #28 is indicated by the PUCCH resource ID field; and spatial relation infor #16 is indicated by the spatial relation info ID field), the UE shall apply the spatial relation info #16 (i.e. the spatial relation contained in the spatial relation info #16 and the power control parameters or the PL-RS associated with the spatial relation info #16) configured in each cell to all PUCCH and PUSCH transmissions in all active UL BWPs in cells with serving cell IDs 0, 1, 2 and 3.

In the further variety of the fourth embodiment, when the common UL beam indication MAC CE is received by the UE, the common UL beam determined for all serving cells in the cell list containing the cell indicated by the serving cell ID field according to the spatial relation info indicated by the spatial relation info ID field applies from the first slot that is after $$\text{slot } k + 3 N_{slot}^{subframe,\mu},$$

where k is the slot where the UE would transmit a PUCCH with HARQ-ACK information for the PDSCH providing the activation command, and a is the smallest SCS configurations of the active DL BWPs of all serving cells in the cell list.

Figure 6:
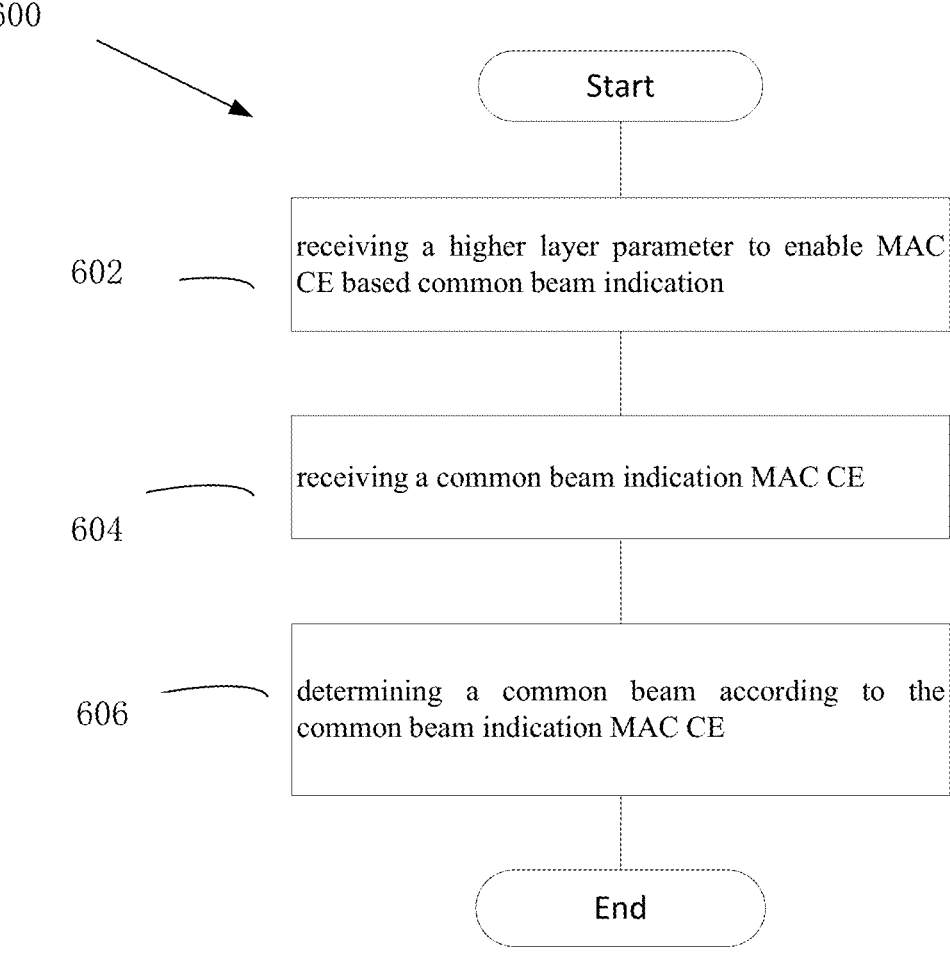
FIG. 6 is a schematic flow chart diagram illustrating an embodiment of a method.

FIG. 6 is a schematic flow chart diagram illustrating an embodiment of a method 600 according to the present application. In some embodiments, the method 600 is performed by an apparatus, such as a remote unit. In certain embodiments, the method 600 may be performed by a processor executing program code, for example, a microcontroller, a microprocessor, a CPU, a GPU, an auxiliary processing unit, a FPGA, or the like.

The method 600 may include 602 receiving a higher layer parameter to enable MAC CE based common beam indication; 604 receiving a common beam indication MAC CE; and 606 determining a common beam according to the common beam indication MAC CE.

In one embodiment, the common beam indication MAC CE contains a TCI field indicating a TCI state, and a common DL beam and a common UL beam are determined for a UE with joint DL/UL beam indication capability according to the indicated TCI state, or a common DL beam is determined for a UE with separate DL/UL beam indication capability according to the indicated TCI state. For the scenario of single-TRP DL transmission, the indicated TCI state applies to reception of all PDCCH and PDSCH transmissions in all BWPs in a cell indicated by the common beam indication MAC CE. For the scenario of single-TRP UL transmission, the QCL-TypeD RS contained in the indicated TCI state is determined as the spatial relation and the PL-RS for transmission of all PUCCH and PUSCH transmissions in all BWPs in a cell indicated by the common beam indication MAC CE for the UE with joint DL/UL beam indication capability. For the scenario of multi-TRP DL transmission, when a higher layer parameter CORESET-PoolIndex is configured for each CORESET, the indicated TCI state applies to reception of all PDCCH transmissions from the CORESET(s) configured with the same CORE-SETPoolIndex as that configured for the CORESET indicated by the common beam indication MAC CE, and to reception of all PDSCH transmissions scheduled by DCI(s) transmitted from the CORESETs configured with the same CORESETPoolIndex as that configured for the CORESET indicated by—the common beam indication MAC CE. For the scenario of multi-TRP UL transmission, the QCL-TypeD RS contained in the indicated TCI state is determined as the spatial relation and the PL-RS for transmission of all PUCCH and PUSCH transmissions associated with the same CORESETPoolIndex as that configured for the CORE-SET indicated by the common beam indication MAC CE.

In another embodiment, the common beam indication MAC CE indicates at least one spatial relation info, and a common UL beam is determined for the UE with separate DL/UL beam indication capability according to the indicated spatial relation info(s). For the single-TRP UL transmission, the spatial relation contained in and the PL-RS associated with a first indicated spatial relation info are determined as the spatial relation and the PL-RS for transmission of all PUCCH and PUSCH transmissions in all BWPs in a cell indicated by the common beam indication MAC CE, if no CORESETPoolIndex is configured for any CORESET in the cell indicated by the common beam indication MAC CE. For the multi-TRP UL transmission, the spatial relation contained in and the PL-RS associated with a first indicated spatial relation info are determined as the spatial relation and the PL-RS for transmission of all PUCCH resources associated with CORESETPoolIndex=0 and all PUSCH transmissions scheduled by DCI(s) transmitted from CORESET(s) configured with CORESET-PoolIndex=0 in all BWPs in a cell indicated by the common beam indication MAC CE, and the spatial relation contained in and the PL-RS associated with a second indicated spatial relation info are determined as the spatial relation and the PL-RS for transmission of all PUCCH resources associated with CORESETPoolIndex=1 and all PUSCH transmissions scheduled by DCI(s) transmitted from CORESET(s) with CORESETPoolIndex=1 in all BWPs in the cell indicated by the common beam indication MAC CE, if a CORESET-PoolIndex is configured for the CORESET(s) in the cell indicated by the common beam indication MAC CE. For the multi-TRP UL transmission, alternatively, when a higher layer parameter CORESETPoolIndex is configured for each CORESET, the spatial relation contained in and the PL-RS associated with the indicated spatial relation info are determined as the spatial relation and the PL-RS for transmission of all PUCCH resources associated with the same CORE-SETPoolIndex and all PUSCH transmissions scheduled by DCI(s) transmitted from the CORESET(s) configured with the same CORESETPoolIndex as that associated with a PUCCH resource indicated in the common beam indication MAC CE in all BWPs in a cell indicated by the common beam indication MAC CE.

The method further comprises receiving a configuration of one or more cell lists each of which is composed of one or multiple serving cells, wherein the common UL beam for UL transmission is enabled for all serving cells in a cell list containing the serving cell. In some embodiment, the common beam indication MAC CE contains a TCI field indicating a TCI state, and the indicated TCI state applies to reception of all PDCCH and PDSCH transmissions and transmission of all PUCCH and PUSCH transmissions in all BWPs in all cells belonging to a cell list containing the cell indicated by the common beam indication MAC CE. In other embodiment, the common beam indication MAC CE indicates a spatial relation info, and the indicated spatial relation info applies to transmission of all PUCCH and PUSCH transmissions in all BWPs in all cells belonging to a cell list containing the cell indicated by the common beam indication MAC CE.

Figure 7:
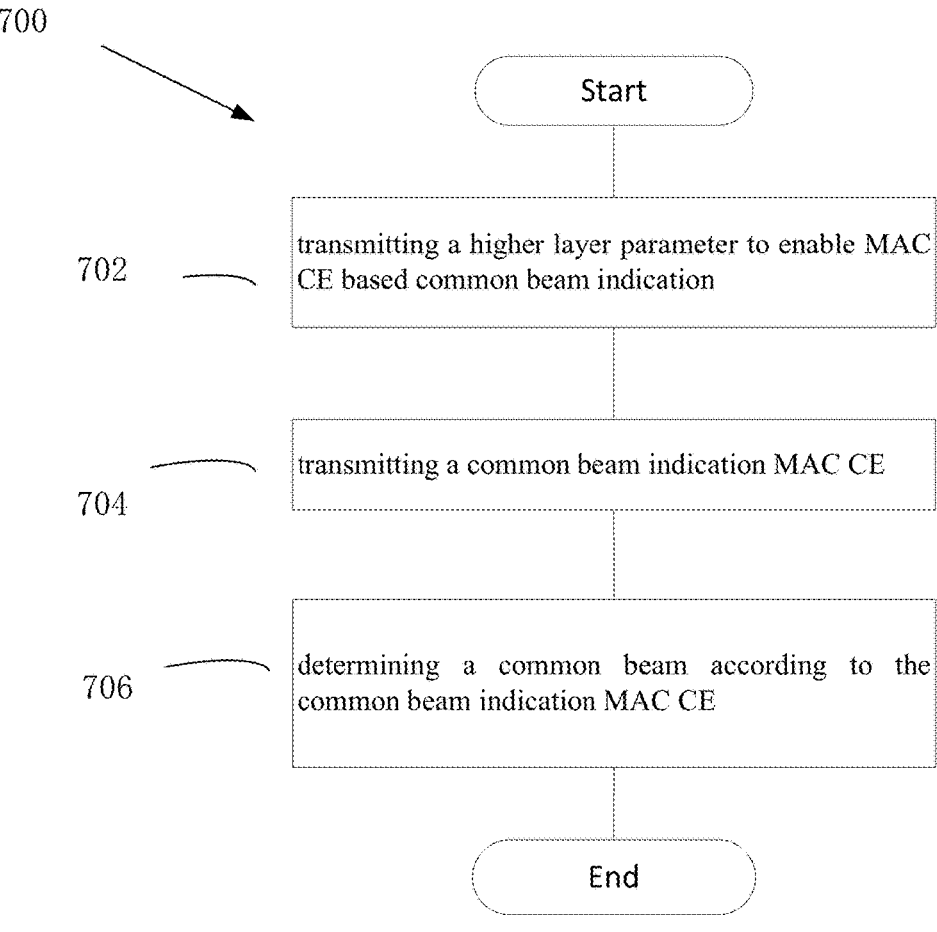
FIG. 7 is a schematic flow chart diagram illustrating a further embodiment of a method.

FIG. 7 is a schematic flow chart diagram illustrating an embodiment of a method 700 according to the present application. In some embodiments, the method 700 is performed by an apparatus, such as a base unit. In certain embodiments, the method 700 may be performed by a processor executing program code, for example, a microcontroller, a microprocessor, a CPU, a GPU, an auxiliary processing unit, a FPGA, or the like.

The method 700 may include transmitting a higher layer parameter to enable MAC CE based common beam indication; transmitting a common beam indication MAC CE; and determining a common beam according to the common beam indication MAC CE.

In one embodiment, the common beam indication MAC CE contains a TCI field indicating a TCI state, and a common DL beam and a common UL beam are determined for a UE with joint DL/UL beam indication capability according to the indicated TCI state, or a common DL beam is determined for a UE with separate DL/UL beam indication capability according to the indicated TCI state. For the scenario of single-TRP DL transmission, the indicated TCI state applies to reception of all PDCCH and PDSCH transmissions in all BWPs in a cell indicated by the common beam indication MAC CE. For the scenario of single-TRP UL transmission, the QCL-TypeD RS contained in the indicated TCI state is determined as the spatial relation and the PL-RS for transmission of all PUCCH and PUSCH transmissions in all BWPs in a cell indicated by the common beam indication MAC CE for the UE with joint DL/UL beam indication capability. For the scenario of multi-TRP DL transmission, when a higher layer parameter CORESET-PoolIndex is configured for each CORESET, the indicated TCI state applies to reception of all PDCCH transmissions from the CORESET(s) configured with the same CORE-SETPoolIndex as that configured for the CORESET indicated by the common beam indication MAC CE, and to reception of all PDSCH transmissions scheduled by DCI(s) transmitted from the CORESETs configured with the same CORESETPoolIndex as that configured for the CORESET indicated by—the common beam indication MAC CE. For the scenario of multi-TRP UL transmission, the QCL-TypeD RS contained in the indicated TCI state is determined as the spatial relation and the PL-RS for transmission of all PUCCH and PUSCH transmissions associated with the same CORESETPoolIndex as that configured for the CORESET indicated by the common beam indication MAC CE.

In another embodiment, the common beam indication MAC CE indicates at least one spatial relation info, and a common UL beam is determined for the UE with separate DL/UL beam indication capability according to the indicated spatial relation info(s). For the single-TRP UL transmission, the spatial relation contained in and the PL-RS associated with a first indicated spatial relation info are determined as the spatial relation and the PL-RS for transmission of all PUCCH and PUSCH transmissions in all BWPs in a cell indicated by the common beam indication MAC CE, if no CORESETPoolIndex is configured for any CORESET in the cell indicated by the common beam indication MAC CE. For the multi-TRP UL transmission, the spatial relation contained in and the PL-RS associated with a first indicated spatial relation info are determined as the spatial relation and the PL-RS for transmission of all PUCCH resources associated with CORESETPoolIndex=0 and all PUSCH transmissions scheduled by DCI(s) transmitted from CORESET(s) configured with CORESET-PoolIndex=0 in all BWPs in a cell indicated by the common beam indication MAC CE, and the spatial relation contained in and the PL-RS associated with a second indicated spatial relation info are determined as the spatial relation and the PL-RS for transmission of all PUCCH resources associated with CORESETPoolIndex=1 and all PUSCH transmissions scheduled by DCI(s) transmitted from CORESET(s) with CORESETPoolIndex=1 in all BWPs in the cell indicated by the common beam indication MAC CE, if a CORESET-PoolIndex is configured for the CORESET(s) in the cell indicated by the common beam indication MAC CE. For the multi-TRP UL transmission, alternatively, when a higher layer parameter CORESETPoolIndex is configured for each CORESET, the spatial relation contained in and the PL-RS associated with the indicated spatial relation info are determined as the spatial relation and the PL-RS for transmission of all PUCCH resources associated with the same CORE-SETPoolIndex and all PUSCH transmissions scheduled by DCI(s) transmitted from the CORESET(s) configured with the same CORESETPoolIndex as that associated with a PUCCH resource indicated in the common beam indication MAC CE in all BWPs in a cell indicated by the common beam indication MAC CE.

The method further comprises transmitting a configuration of one or more cell lists each of which is composed of one or multiple serving cells, wherein the common UL beam for UL transmission is enabled for all serving cells in a cell list containing the serving cell. In some embodiment, the common beam indication MAC CE contains a TCI field indicating a TCI state, and the indicated TCI state applies to reception of all PDCCH and PDSCH transmissions and transmission of all PUCCH and PUSCH transmissions in all BWPs in all cells belonging to a cell list containing the cell indicated by the common beam indication MAC CE. In other embodiment, the common beam indication MAC CE indicates a spatial relation info, and the indicated spatial relation info applies to transmission of all PUCCH and PUSCH transmissions in all BWPs in all cells belonging to a cell list containing the cell indicated by the common beam indication MAC CE.

Figure 8:
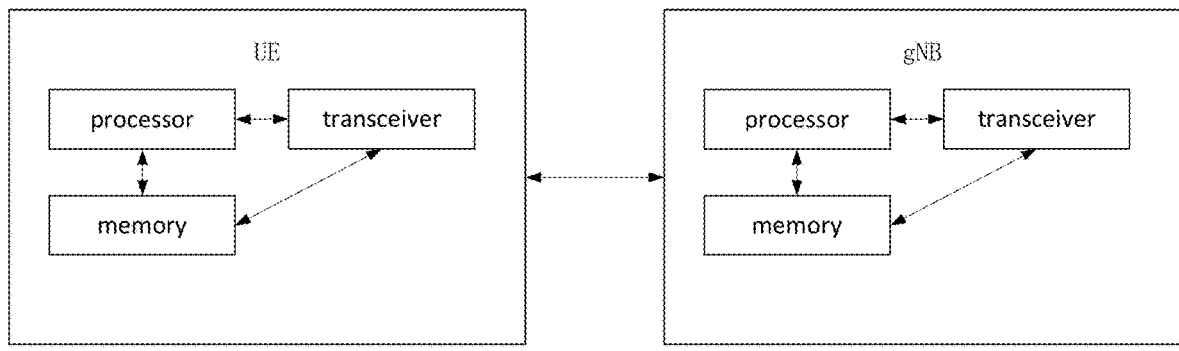
FIG. 8 is a schematic block diagram illustrating apparatuses according to one embodiment.

FIG. 8 is a schematic block diagram illustrating apparatuses according to one embodiment.

Referring to FIG. 8, the UE (i.e. the remote unit) includes a processor, a memory, and a transceiver. The processor implements a function, a process, and/or a method which are proposed in FIG. 6.

The remote unit comprises a receiver that receives a higher layer parameter to enable MAC CE based common beam indication, and further receives a common beam indication MAC CE; and a processor that determines a common beam according to the common beam indication MAC CE.

In one embodiment, the common beam indication MAC CE contains a TCI field indicating a TCI state, and a common DL beam and a common UL beam are determined for a UE with joint DL/UL beam indication capability according to the indicated TCI state, or a common DL beam is determined for a UE with separate DL/UL beam indication capability according to the indicated TCI state. The indicated TCI state applies to reception of all PDCCH and PDSCH transmissions in all BWPs in a cell indicated by the common beam indication MAC CE. The QCL-TypeD RS contained in the indicated TCI state is determined as the spatial relation and the PL-RS for transmission of all PUCCH and PUSCH transmissions in all BWPs in a cell indicated by the common beam indication MAC CE for the UE with joint DL/UL beam indication capability. When a higher layer parameter CORESETPoolIndex is configured for each CORESET, the indicated TCI state applies to reception of all PDCCH transmissions from the CORESET(s) configured with the same CORESETPoolIndex as that configured for the CORESET indicated by the common beam indication MAC CE, and to reception of all PDSCH transmissions scheduled by DCI(s) transmitted from the CORESETs configured with the same CORESET-PoolIndex as that configured for the CORESET indicated by—the common beam indication MAC CE. The QCL-TypeD RS contained in the indicated TCI state is determined as the spatial relation and the PL-RS for transmission of all PUCCH and PUSCH transmissions associated with the same CORESETPoolIndex as that configured for the CORE-SET indicated by the common beam indication MAC CE.

In another embodiment, the common beam indication MAC CE indicates at least one spatial relation info, and a common UL beam is determined for the UE with separate DL/UL beam indication capability according to the indicated spatial relation info(s). The spatial relation contained in and the PL-RS associated with a first indicated spatial relation info are determined as the spatial relation and the PL-RS for transmission of all PUCCH and PUSCH transmissions in all BWPs in a cell indicated by the common beam indication MAC CE, if no CORESETPoolIndex is configured for any CORESET in the cell indicated by the common beam indication MAC CE. The spatial relation contained in and the PL-RS associated with a first indicated spatial relation info are determined as the spatial relation and the PL-RS for transmission of all PUCCH resources associated with CORESETPoolIndex=0 and all PUSCH transmissions scheduled by DCI(s) transmitted from CORESET(s) configured with CORESETPoolIndex=0 in all BWPs in a cell indicated by the common beam indication MAC CE, and the spatial relation contained in and the PL-RS associated with a second indicated spatial relation info are determined as the spatial relation and the PL-RS for transmission of all PUCCH resources associated with CORESETPoolIndex=1 and all PUSCH transmissions scheduled by DCI(s) transmitted from CORESET(s) with CORESETPoolIndex=1 in all BWPs in the cell indicated by the common beam indication MAC CE, if a CORESET-PoolIndex is configured for the CORESET(s) in the cell indicated by the common beam indication MAC CE. When a higher layer parameter CORESETPoolIndex is configured for each CORESET, the spatial relation contained in and the PL-RS associated with the indicated spatial relation info are determined as the spatial relation and the PL-RS for transmission of all PUCCH resources associated with the same CORESETPoolIndex and all PUSCH transmissions scheduled by DCI(s) transmitted from the CORESET(s) configured with the same CORESETPoolIndex as that associated with a PUCCH resource indicated in the common beam indication MAC CE in all BWPs in a cell indicated by the common beam indication MAC CE.

In some embodiment, the receiver further receives a configuration of one or more cell lists each of which is composed of one or multiple serving cells, wherein the common UL beam for UL transmission is enabled for all serving cells in a cell list containing the serving cell. In some embodiment, the common beam indication MAC CE contains a TCI field indicating a TCI state, and the indicated TCI state applies to reception of all PDCCH and PDSCH transmissions and transmission of all PUCCH and PUSCH transmissions in all BWPs in all cells belonging to a cell list containing the cell indicated by the common beam indication MAC CE. In other embodiment, the common beam indication MAC CE indicates a spatial relation info, and the indicated spatial relation info applies to transmission of all PUCCH and PUSCH transmissions in all BWPs in all cells belonging to a cell list containing the cell indicated by the common beam indication MAC CE.

The gNB (i.e. base unit) includes a processor, a memory, and a transceiver. The processors implement a function, a process, and/or a method which are proposed in FIG. 7.

The base unit comprises a transmitter that transmits a higher layer parameter to enable MAC CE based common beam indication, and transmits a common beam indication MAC CE; and a processor that determines a common beam according to the common beam indication MAC CE.

In one embodiment, the common beam indication MAC CE contains a TCI field indicating a TCI state, and a common DL beam and a common UL beam are determined for a UE with joint DL/UL beam indication capability according to the indicated TCI state, or a common DL beam is determined for a UE with separate DL/UL beam indication capability according to the indicated TCI state. The indicated TCI state applies to reception of all PDCCH and PDSCH transmissions in all BWPs in a cell indicated by the common beam indication MAC CE. The QCL-TypeD RS contained in the indicated TCI state is determined as the spatial relation and the PL-RS for transmission of all PUCCH and PUSCH transmissions in all BWPs in a cell indicated by the common beam indication MAC CE for the UE with joint DL/UL beam indication capability. When a higher layer parameter CORESETPoolIndex is configured for each CORESET, the indicated TCI state applies to reception of all PDCCH transmissions from the CORESET(s) configured with the same CORESETPoolIndex as that configured for the CORESET indicated by the common beam indication MAC CE, and to reception of all PDSCH transmissions scheduled by DCI(s) transmitted from the CORESETs configured with the same CORESET-PoolIndex as that configured for the CORESET indicated by—the common beam indication MAC CE. The QCL-TypeD RS contained in the indicated TCI state is determined as the spatial relation and the PL-RS for transmission of all PUCCH and PUSCH transmissions associated with the same CORESETPoolIndex as that configured for the CORE-SET indicated by the common beam indication MAC CE.

In another embodiment, the common beam indication MAC CE indicates at least one spatial relation info, and a common UL beam is determined for the UE with separate DL/UL beam indication capability according to the indicated spatial relation info(s). The spatial relation contained in and the PL-RS associated with a first indicated spatial relation info are determined as the spatial relation and the PL-RS for transmission of all PUCCH and PUSCH transmissions in all BWPs in a cell indicated by the common beam indication MAC CE, if no CORESETPoolIndex is configured for any CORESET in the cell indicated by the common beam indication MAC CE. The spatial relation contained in and the PL-RS associated with a first indicated spatial relation info are determined as the spatial relation and the PL-RS for transmission of all PUCCH resources associated with CORESETPoolIndex=0 and all PUSCH transmissions scheduled by DCI(s) transmitted from CORESET(s) configured with CORESETPoolIndex=0 in all BWPs in a cell indicated by the common beam indication MAC CE, and the spatial relation contained in and the PL-RS associated with a second indicated spatial relation info are determined as the spatial relation and the PL-RS for transmission of all PUCCH resources associated with CORESETPoolIndex=1 and all PUSCH transmissions scheduled by DCI(s) transmitted from CORESET(s) with CORESETPoolIndex=1 in all BWPs in the cell indicated by the common beam indication MAC CE, if a CORESET-PoolIndex is configured for the CORESET(s) in the cell indicated by the common beam indication MAC CE. When a higher layer parameter CORESETPoolIndex is configured for each CORESET, the spatial relation contained in and the PL-RS associated with the indicated spatial relation info are determined as the spatial relation and the PL-RS for transmission of all PUCCH resources associated with the same CORESETPoolIndex and all PUSCH transmissions scheduled by DCI(s) transmitted from the CORESET(s) configured with the same CORESETPoolIndex as that associated with a PUCCH resource indicated in the common beam indication MAC CE in all BWPs in a cell indicated by the common beam indication MAC CE.

In some embodiment, the transmitter further transmits a configuration of one or more cell lists each of which is composed of one or multiple serving cells, wherein the common UL beam for UL transmission is enabled for all serving cells in a cell list containing the serving cell. In some embodiment, the common beam indication MAC CE contains a TCI field indicating a TCI state, and the indicated TCI state applies to reception of all PDCCH and PDSCH transmissions and transmission of all PUCCH and PUSCH transmissions in all BWPs in all cells belonging to a cell list containing the cell indicated by the common beam indication MAC CE. In other embodiment, the common beam indication MAC CE indicates a spatial relation info, and the indicated spatial relation info applies to transmission of all PUCCH and PUSCH transmissions in all BWPs in all cells belonging to a cell list containing the cell indicated by the common beam indication MAC CE.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated in the appended claims rather than by the foregoing description. All changes which come within the meaning and range of equivalency of the claims are to be embraced within their scope.

The invention claimed is:

1. A user equipment (UE) for wireless communications, comprising:
   at least one memory; and
   at least one processor coupled with the at least one memory and operable to cause the UE to:
      receive medium access control (MAC) control element (CE) that indicates a common downlink beam for reception of physical downlink control channel (PDCCH) transmissions and physical downlink shared channel (PDSCH) transmissions, wherein the MAC CE indicates a transmission configuration indicator (TCI) state for both downlink reception and uplink transmission;
      determine, based at least in part on the TCI state, the common downlink beam for the reception of the PDCCH transmissions and the PDSCH transmissions; and
      determine, based at least in part on a quasi-colocation (QCL)-TypeD reference signal associated with the TCI state and a pathloss-reference signal (PL-RS) associated with the TCI state, a common uplink beam for transmission of physical uplink control channel (PUCCH) transmissions and physical uplink shared channel (PUSCH transmissions.

2. The UE of claim 1, wherein the MAC CE comprises a TCI field that indicates the TCI state, and wherein the UE has at least one of a joint downlink and uplink beam indication capability or a separate downlink and uplink beam indication capability according to the TCI state.

3. The UE of claim 2, wherein the TCI state applies to the reception of the PDCCH transmissions and the PDSCH transmissions in one or more bandwidth parts (BWPs) in a cell indicated by the MAC CE.

4. The UE of claim 2, wherein the QCL-TypeD reference signal is determined as a spatial relation and the PL-RS for the transmission of the PUCCH transmissions and the PUSCH transmissions in one or more band width parts (BWPs) in a cell indicated by the MAC CE, wherein the UE has the joint downlink and uplink beam indication capability.

5. The UE of claim 2, wherein a higher layer parameter CORESETPoolIndex is configured for one or more respective control resource sets (CORESETs), wherein the TCI state applies to reception of the PDCCH transmissions from one or more CORESETs configured with a same CORESETPoolIndex as that configured for a CORESET indicated by the MAC CE, and wherein the TCI state applies to reception of the PDSCH transmissions scheduled by at least one downlink control information (DCI) transmitted from the CORESETs configured with the same CORESETPoolIndex as that configured for the CORESET indicated by the MAC CE.

6. The apparatus UE of claim 2, wherein the PUCCH transmissions and the PUSCH transmissions are associated with a same CORESETPoolIndex as that configured for a CORESET indicated by the MAC CE.

7. The UE of claim 1, wherein the MAC CE indicates spatial relation information, and wherein the common uplink beam is determined based at least in part on the UE having a separate downlink and uplink beam indication capability according to the spatial relation information.

8. The UE of claim 7, wherein the PL-RS comprises a spatial relation associated with the spatial relation information, and wherein the PUCCH transmissions and the PUSCH transmissions are in one or more band width parts (BWPs) in a cell indicated by the MAC CE based at least in part on a CORESETPoolIndex not being configured for a CORE-SET in the cell indicated by the MAC CE.

9. The UE of claim 7, wherein the PL-RS comprises a spatial relation associated with first spatial relation information for one or more first PUCCH transmissions associated with CORESETPoolIndex=0 and one or more first PUSCH transmissions scheduled by at least one first downlink control information (DCI) transmitted from one or more first control resource sets (CORESETs) configured with CORE-SETPoolIndex=0 in one or more first band width parts (BWPs) in a cell indicated by the MAC CE, and wherein the spatial relation is associated with second spatial relation information for one or more second PUCCH transmissions associated with CORESETPoolIndex=1 and one or more second PUSCH transmissions scheduled by at least one second DCI transmitted from one or more second CORE-SETs with CORESETPoolIndex=1 in one or more second BWPs in the cell indicated by the MAC CE based at least in part on a CORESETPoolIndex being configured for the one or more second CORESETs in the cell indicated by the MAC CE.

10. The UE of claim 7, wherein a higher layer parameter CORESETPoolIndex is configured for one or more respective control resource sets (CORESETs), and wherein the PL-RS comprises a spatial relation associated with the spatial relation information for one or more PUCCH transmissions associated with a same first CORESETPoolIndex and one or more PUSCH transmissions scheduled by at least one downlink control information (DCI) transmitted from one or more CORESETs configured with a same second CORESETPoolIndex as that associated with a PUCCH resource indicated in the MAC CE in one or more band width parts (BWPs) in a cell indicated by the MAC CE.

11. The UE of claim 1, wherein the at least one processor is further operable to cause the UE to:

receive a configuration of one or more cell lists comprising one or more respective serving cells, wherein the common uplink beam is enabled for the one or more respective serving cells in a cell list of the one or more cell lists comprising a serving cell, and wherein the MAC CE indicates the serving cell.

12. The apparatus UE of claim 11, wherein the MAC CE comprises a TCI field that indicates the TCI state, and wherein the TCI state applies to the PDCCH transmissions, the PDSCH transmission, the PUCCH transmissions, and the PUSCH transmissions in one or more band width parts (BWPs) in cells belonging to the cell list.

13. The UE of claim 11, wherein the MAC CE indicates a spatial relation information, and wherein the indicated spatial relation information applies to the transmission of the PUCCH transmissions and the PUSCH transmissions in one or more band width parts (BWPs) in cells belonging to the cell list.

14. A method performed by a user equipment (UE), the method comprising:

receiving a medium access control (MAC) control element (CE) that indicates a common downlink beam for reception of physical downlink control channel (PDCCH) transmissions and physical downlink shared channel (PDSCH) transmissions, wherein the MAC CE indicates a transmission configuration indicator (TCI) state for both downlink reception and uplink transmission;

determining, based at least in part on the TCI state, the common downlink beam for the reception of the PDCCH transmissions and the PDSCH transmissions; and determining, based at least in part on a quasi-colocation (QCL)-TypeD reference signal associated with the TCI state and a pathloss-reference signal (PL-RS) associated with the TCI state, a common uplink beam for transmission of physical uplink control channel (PUCCH) transmissions and physical uplink shared channel (PUSCH) transmissions.

15. The method of claim 14, wherein the MAC CE comprises a TCI field that indicates the TCI state, and wherein the UE has at least one of joint downlink and uplink beam indication capability or separate downlink and uplink beam indication capability according to the TCI state.

16. The method of claim 14, wherein the MAC CE indicates spatial relation information, and wherein the common uplink beam is determined based at least in part on the UE having a separate downlink and uplink beam indication capability according to the spatial relation information.

17. The method of claim 14, further comprising:

receiving a configuration of one or more cell lists comprising one or more respective serving cells, wherein the common uplink beam is enabled for the one or more respective serving cells in a cell list of the one or more cell lists comprising a serving cell, and wherein the MAC CE indicates the serving cell.

18. The method of claim 17, wherein the MAC CE comprises a TCI field that indicates the TCI state, and wherein the TCI state applies to the PDCCH transmissions, the PDSCH transmissions, the PUCCH transmissions, and the PUSCH transmissions in one or more band width parts (BWPs) in cells belonging to the cell list.

19. A network equipment (NE) for wireless communications, comprising:

at least one memory; and at least one processor coupled with the at least one memory and operable to cause the NE to:

transmit a medium access control (MAC) control element (CE) that indicates a common downlink beam for reception of physical downlink control channel (PDCCH) transmissions and physical downlink shared channel (PDSCH) transmissions at a user equipment (UE), wherein the MAC CE indicates a transmission configuration indicator (TCI) state for both downlink reception and uplink transmission;

determine, based at least in part on the TCI state, the common downlink beam for the reception of the PDCCH transmissions and the PDSCH transmissions; and determine, based at least in part on a quasi-colocation (QCL)-TypeD reference signal associated with the TCI state and a pathloss-reference signal (PL-RS) associated with the TCI state, a common uplink beam for transmission of physical uplink control channel (PUCCH) transmissions and physical uplink shared channel (PUSCH) transmissions at the UE.

20. A method performed by a network equipment (NE), the method comprising:

transmitting a medium access control (MAC) control element (CE) that indicates a common downlink beam for reception of physical downlink control channel (PDCCH) transmissions and physical downlink shared channel (PDSCH) transmissions at a user equipment (UE), wherein the MAC CE indicates a transmission configuration indicator (TCI) state for both downlink reception and uplink transmission;

determining, based at least in part on the TCI state, the common downlink beam for the reception of the PDCCH transmissions and the PDSCH transmissions; and determining, based at least in part on a quasi-colocation (QCL)-TypeD reference signal associated with the TCI state and a pathloss-reference signal (PL-RS) associated with the TCI state, a common uplink beam for transmission of physical uplink control channel (PUCCH) transmissions and physical uplink shared channel (PUSCH) transmissions at the UE.

* * * * *